CONNECTING MEANS FOR CONDUCTORS OF COAXIAL ELECTRICAL TRANSMISSION LINES

Original Filed Nov. 14, 1942 2 Sheets-Sheet 1

INVENTOR.
WILLIAM A. BRUNO

BY

Hans Steinberg

Sept. 30, 1947. W. A. BRUNO Re. 22,920

CONNECTING MEANS FOR CONDUCTORS OF COAXIAL ELECTRICAL TRANSMISSION LINES

Original Filed Nov. 14, 1942 2 Sheets-Sheet 2

INVENTOR.
WILLIAM A. BRUNO

BY Alexander Steinberg

Reissued Sept. 30, 1947

Re. 22,920

UNITED STATES PATENT OFFICE 22,920

CONNECTING MEANS FOR CONDUCTORS OF COAXIAL ELECTRICAL TRANSMISSION LINES

William A. Bruno, deceased, late of New Hyde Park, N. Y., by the firm Bruno Patents, Inc., Long Island City, N. Y., assignee Original No. 2,365,048, dated December 12, 1944, Serial No. 465,592, November 14, 1942. Application for reissue November 10, 1945, Serial No. 627,962

5 Claims. (Cl. 174—21)

This invention relates to transmission lines of coaxial, electrical conductors, in which one conductor is concentrically located inside of the other, and has particular relation to improved means for connecting two sections of coaxial, electrical conductors, one of which is stationary while the other is capable of rotary movement relative to the stationary conductor.

One object of this invention is to provide a gas-tight connecting means for two axially aligned outer conductor sections of a co-axial, electrical transmission line one of said conductor sections being capable of rotary movement relative to the other.

Another object of this invention is to provide a connecting means of the above mentioned type, which forms a gas-tight and fluid-tight seal and permits of rotary movement of one of the conductor sections relative to the other.

A further object of this invention is to provide connecting means which is adapted to be applied to axially aligned conductor sections of co-axial transmission lines and to provide for gaseous and fluid seal during rotation of said sections relative to each other.

Other objects and advantages will appear to those skilled in the art from the following specification and claims, and the appended drawings which illustrate, by way of example, certain preferred embodiments of the invention, and in which:

Fig. 2 is a vertical sectional view of a connecting means providing for gaseous and liquid seal according to this invention.

Figure 1:
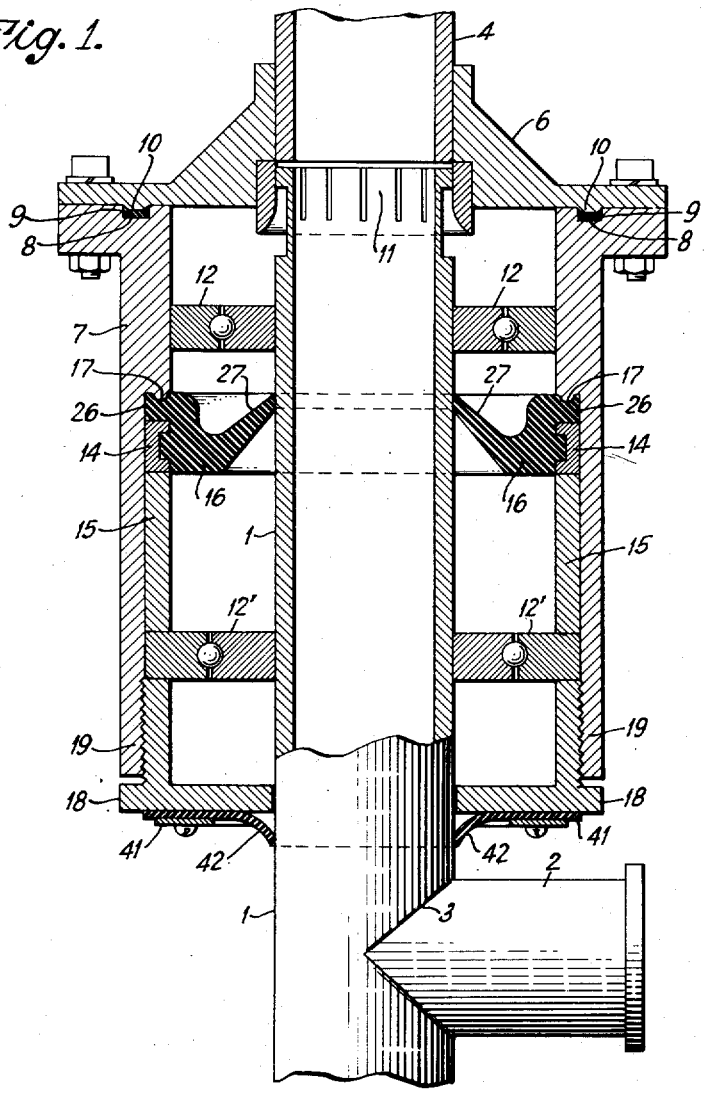
Fig. 1 is a vertical, sectional view of a connecting means providing for gaseous seal according to my invention.

Referring now to Fig. 1, a tubular outer conductor element 1 of a co-axial electrical transmission line is connected with a right angle branch piece 2, i. e. by soldering at the V-shaped incision 3. Outer conductor element 1 is capable of rotary movement, and axially aligned with outer conductor element 4, which is stationary and has an interior conductive surface, the shape and dimensions of which are substantially equal to those of outer conductor element 1. The end portion of stationary conductor element 4 is housed, as shown, by flanged element or cover 6. This element 6 rests on flanged tubular casing 7. The flange of the latter is provided with an annular groove 8 housing a resilient gasket 9 and adapted to receive a registering annular projection 10 of element 6. As shown in the drawings, conductor element 1 is axially aligned with element 4 and telescopically engages with its slotted end 11 the adjacent end of conductor section 4.

A ball bearing 12 fitting into casing 7 is arranged in said casing and held in place by suitable fastening means not shown in the drawings. A gas-tight seal for the joint of conductor sections 1 and 4 is obtained by the use of a sealing element comprising ring 14 consisting preferably of a suitable metal and annular element 16. The latter consists of a suitable resilient material, and is connected with ring 14 i. e. by molding. The sealing element is inserted in casing 7 and held in place between a shoulder of the tubular wall of casing 7 or a projection 17 provided on said shoulder, and the upper end portion of spacing ring 15 while its inner annular end portion 27 bears against conductor section 1 and forms a gaseous seal. Ring 15 rests on the upper surface of a second ball bearing 12' fitting into casing 7 and held in place by cover 18, which is adapted to be screwed into the threaded end portion 19 of casing 7. Upon assembling the above described parts, cover 18 is screwed into threaded portion 19 until a moderate pressure is exerted on portion 26 of resilient element 16, and inner annular end portion 27 of this element bears against outer conductor 1 to form a gas-tight seal for the joint of conductor sections 1 and 4, and for gas escaping from the interior of the co-axial cable through the slots of end portion 11.

As will be understood from the foregoing, outer conductor 4, element 6 and casing 7 are stationary, while conductor element 1 is capable of rotary movement under gaseous seal. Element 16 preferably consists of synthetic, oil-resistant rubber, but any other sufficiently resistant and resilient material may also be used. The inner conductor elements (not shown in the drawings) of the co-axial cable line are centrally arranged in the customary manner.

Fig. 2 illustrates another embodiment of the invention and shows a connecting means forming a gas-tight and liquid-tight seal for the joint of two axially aligned co-axial cable sections, one of which is stationary, while the other is capable of rotary movement relative to said stationary conductor sections. Conductor sections 1 and 4, cover elements 6, tubular casing 7, ball bearing 12 and first sealing element comprising ring 14, and annular, resilient element 16, as well as the mutual relation and arrangement of these elements, are substantially similar to the corresponding elements shown in Fig. 1. Spacing ring 15 is provided with a hole 15' which communicates with a corresponding hole 15'' in the wall of tubular casing 7. Hole 15'' can be closed by means not shown in the drawings. A second sealing element, which is substantially similar to the above mentioned first sealing element and comprises ring 14' and annular resilient element 16' is also inserted in casing 7, and oil may be introduced into the space between said first and second sealing elements through holes 15' and 15''. In order to obtain an oil-tight seal, an annular sealing element 36 and a metal ring 37 are introduced into casing 7, said elements 36 and 37 being held in place by ball-bearing 12', which in turn is supported by cover 18 adapted to be screwed in the threaded end portion 19 of casing 7. After assembling the above described elements, cover 18 is screwed into threaded portion 19 of casing 7 until the necessary pressure is exerted on portion 26 and 26' of annular elements 16 and 16', respectively, and ring element 36, which consists of a resilient, oil-resistant material, such as neoprene, forms a tight seal for the oil introduced through holes 15'' and 15'.

Figure 3:
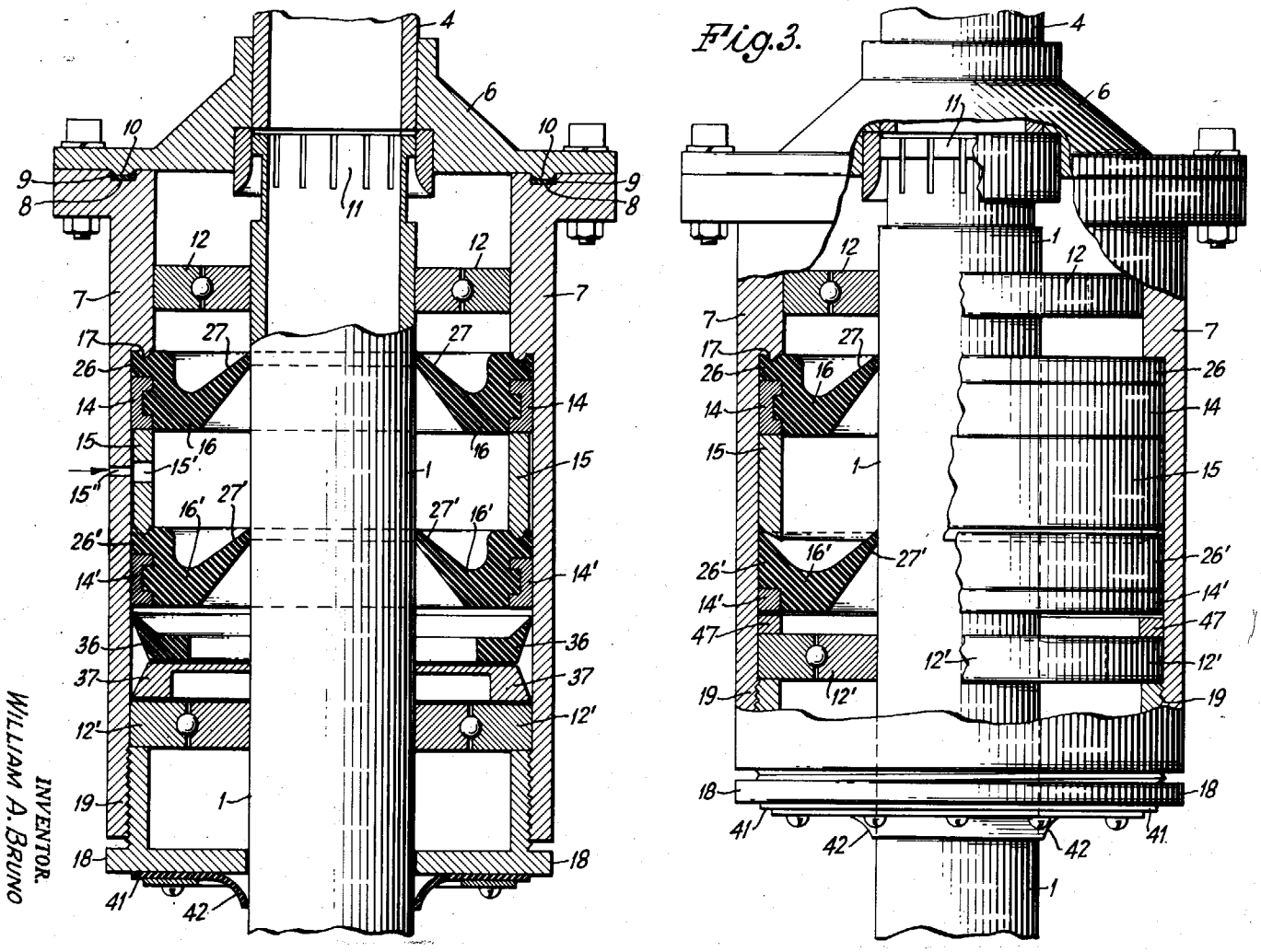
Fig. 3 is a vertical sectional view of a modified embodiment of such connecting means.

In the embodiment illustrated in Fig. 3, conductor sections 1 and 4, cover element 6, tubular casing 7, ball bearing 12, and first sealing element comprising ring 14, and annular, resilient element 16, as well as the relation and arrangement of these elements are similar to the corresponding elements and their arrangement illustrated in Fig. 2. The lower end portion of spacing ring 15 is inwardly tapered. Outer peripheral portion 26' of annular sealing element 16' fits to the tapered end portion of ring 15 and annular elements 16 and 16' are adapted to form a tight seal for grease introduced into the space between annular elements 16 and 16', while element 16 is adapted to form a gaseous seal for the joint of conductors 1 and 4. Sealing elements 16 and 16' are held in place by spacing ring 15, ring 47, ball bearing 12' and cover 18 which is adapted to be screwed in threaded end portion 19 of casing 7, and to cause sufficient compression of the outer peripheral portions 26 and 26' of elements 16 and 16'.

As shown in Figs. 1, 2 and 3, a resilient cover 41 may be fastened to cover 18. This resilient cover 41 is fastened to cover 18, and has a flexed annular portion 42, serving to prevent the entrance of dust or other impurities into casing 7.

Figure 1A:
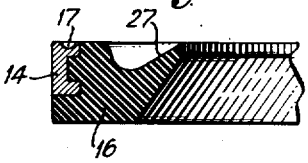
Figs. 1A and 1B show modified forms of the sealing element used in the embodiment shown in Fig. 1.
Figure 1B:
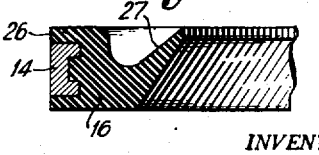

Figures 1A and 1B illustrate two somewhat modified embodiments of sealing elements which may be used instead of sealing elements 16 shown in Figs. 1, 2 and 3, or sealing element 16' shown in Figs. 1 and 2.

Instead of the ball bearings shown, other suitable bearing systems may be used.

It will be understood that this invention may be carried out in specific ways other than those herein set forth and the embodiments should be, therefore, considered as illustrative and not restrictive within the spirit of the invention as defined in the appended claims.

What is claimed is:

1. In a coupling means for a first stationary tubular conductor section of a co-axial, electrical transmission line and a second tubular conductor section axially aligned with said first section and capable of rotating movement relative to said first section a stationary, tubular casing rotatably housing an end portion of said second conductor section, said tubular casing being in gas-tight connection with a cover housing the joint of said first and second conductor section, said second conductor section being capable of rotating movement in a first and second bearing, said bearings being in spaced relation to each other and housed by said casing, a first annular sealing means fitting into the casing, comprising a rigid ring and an annular resilient sealing element connected to said ring and overlapping at least one end portion of said ring, one outer peripheral end portion of said first sealing means bearing against a shoulder formed in the inner tubular surface of the casing, and the other outer peripheral end portion of said first sealing means abutting upon one end portion of a spacing ring, the other end portion of which is inwardly tapered, a second annular sealing means comprising a rigid ring and an annular resilient sealing element connected to said ring, one outer peripheral end portion of the resilient element of said second sealing means fitting to said inwardly tapered end portion of the spacing ring, said second sealing means being arranged between the spacing ring and the second bearing, a tubular cover having a threaded tubular portion adapted to be screwed into a threaded end portion of the casing and to cause compression of outer peripheral portions of resilient elements of said first and second sealing means, an inner peripheral end portion of the annular, resilient sealing element of the first sealing means bearing against the second conductor section, and being adapted to form a gas-tight seal for the joint of the first and second conductor section, an inner peripheral end portion of the annular, resilient sealing element of the second sealing means bearing against the second conductor section, said first and second sealing means forming a seal for the space encompassed by these sealing means, the second conductor section and the casing.

2. In a coupling means for a first stationary tubular conductor section of a co-axial, electrical transmission line, and a second tubular conductor section axially aligned with said first section and capable of rotating movement relative to said first section, a stationary, tubular casing rotatably housing an end portion of said second conductor section, said tubular casing being in gas-tight connection with a cover housing the joint of said first and second conductor section, said second conductor section being capable of rotating movement in a first and second bearing, said bearings being in spaced relation and housed by said casing, a first annular sealing means fitting into the casing and comprising a rigid ring and an annular resilient sealing element connected to said ring, one outer peripheral end portion of said first sealing means bearing against a shoulder formed in the inner tubular surface of the casing, and the other outer peripheral end portion of said first sealing means abutting upon one end portion of a spacing ring, the other end portion of which abuts upon an outer peripheral end portion of a second annular sealing means comprising a rigid ring and an annular, resilient sealing element connected to said ring and overlapping at least one end portion of said ring, a third annular, resilient sealing means having a tapered outer peripheral portion abutting against the other outer peripheral end portion of the second sealing means, and arranged between the second sealing means and the second bearing, a tubular cover having a threaded tubular portion adapted to be screwed into a threaded end portion of the casing, and to cause compression of outer, resilient peripheral portions of said first, second and third sealing means, an inner peripheral end portion of the annular resilient sealing element of the first sealing means bearing against the second conductor section to form a gas-tight seal for the joint of the first and second conductor section, an inner peripheral end portion of the annular, resilient sealing element of the second sealing means bearing against the second conductor section, said first, second and third sealing means forming a seal for the space encompassed by the first and second sealing means and the second conductor section and the casing.

3. In a connecting means for a first stationary tubular conductor section of a co-axial, electrical transmission line, and a second tubular conductor section axially aligned with said first section and capable of rotating movement relative to said first section, a stationary tubular casing rotatably housing an end portion of said second conductor section, said tubular casing being in gas-tight connection with a cover housing the joint of said first and second conductor section, and annular resilient sealing means for the coaxial transmission line, said sealing means being housed by said casing, said sealing means consisting of an outer peripheral reinforcing and pressure-transmitting rigid ring of [-shaped cross-section, said ring being connected with a registering outer profile of a resilient sealing element having an annular peripheral portion overlapping at least one end portion of said ring, and having a centrally converging, tapering portion having conical surfaces, bearing against the second conductor section, means for holding an outer peripheral portion of said resilient sealing means in compressed condition in said casing, said sealing means being adapted to form a gas-tight seal for the joint of the first and second conductor section.

4. In a coupling means for a first stationary tubular conductor section of a co-axial, electrical transmission line, and a second tubular conductor section axially aligned with said first section and capable of rotating movement relative to said first section, a stationary, tubular casing rotatably housing an end portion of said second conductor section, said tubular casing being in gas-tight connection with a cover housing the joint of said first and second conductor section, said second conductor section being capable of rotating in a first and second bearing, said bearings being in spaced relation to each other and housed by said casing, an annular sealing means fitting into the casing, said sealing means comprising an outer peripheral, reinforcing and pressure-transmitting rigid ring of [-shaped cross-section, said ring being connected with a registering outer profile of a resilient sealing element having an annular peripheral portion overlapping at least one end portion of said ring, and having a centrally converging, tapering portion having conical surfaces, bearing against the second conductor section, said sealing means being adapted to form a gas-tight seal for the joint of the first and second conductor section, one outer peripheral end portion of said sealing means bearing against a shoulder formed in the inner tubular surface of the casing, and the other outer peripheral end portion of said sealing means abutting upon a spacing ring arranged between said sealing means and the second bearing, a tubular cover having a threaded tubular portion adapted to be screwed into a threaded end portion of the casing and to cause compression of outer peripheral portions of the resilient element of the sealing means arranged between said shoulder and said spacing ring.

5. In a coupling means for a first stationary tubular conductor section of a co-axial, electrical transmission line, and a second tubular conductor section axially aligned with said first section and capable of rotating movement relative to said first section, a housing cover, a tubular casing having a closure at one end and the housing cover at its opposite end of said casing, housing an end portion of said second conductor section, said tubular casing being in gas-tight connection with said housing cover; said housing cover encasing the joint of said first and second conductor section, first and second bearings supporting said second conductor section with respect to said casing, means for mounting said first and second conductor sections to render them capable of relative rotation with respect to each other in said first and second bearings, means for supporting said bearings in spaced relation to each other in said casing, an annular sealing means fitting into the casing, said sealing means comprising an outer peripheral, reinforcing and pressure-transmitting rigid ring of [-shaped cross-section, said ring being connected with a registering outer profile of a resilient sealing element having an annular peripheral portion overlapping one end portion of said ring, and having a centrally converging, tapering portion having conical surfaces, bearing against the second conductor section, said sealing means being adapted to form a gas-tight seal for the joint of the first and second conductor section, one outer peripheral end portion of said sealing means bearing against a shoulder formed in the inner tubular surface of the casing, and a spacing ring, the other outer peripheral end portion of said sealing means abutting upon said spacing ring arranged between said sealing means and the second bearing, said casing having a threaded end portion, said closure comprising a tubular cover having a threaded tubular portion adapted to be screwed into said threaded end portion of the casing and to cause compression of outer peripheral portions of the resilient element of the sealing means arranged between said shoulder and said spacing ring.

BRUNO PATENTS, INC.,
*Assignee of William A. Bruno, Deceased.*
By CHARLES R. DE SALES,
*Secretary.*

REFERENCES CITED

The following references are of record in the file of this patent:

UNITED STATES PATENTS

| Number | Name | Date |
|---|---|---|
| 980,776 | Hardsocg | Jan. 3, 1911 |
| 1,805,956 | Shonnard | May 19, 1931 |
| 2,332,529 | Reppert | Oct. 26, 1943 |
| 2,356,351 | Phillips | Aug. 22, 1944 |